United States Patent [19]
Tomotake et al.

[11] Patent Number: 4,903,814
[45] Date of Patent: * Feb. 27, 1990

[54] CLUTCH DISC

[75] Inventors: Hroshi Tomotake, Ikeda; Yasunobu Fukatani, Hirakata, both of Japan

[73] Assignee: Kabushi Kaisha Daikin Seisakusho, Osaka, Japan

[*] Notice: The portion of the term of this patent subsequent to May 3, 2005 has been disclaimed.

[21] Appl. No.: 141,664

[22] Filed: Dec. 15, 1987

[30] Foreign Application Priority Data

May 12, 1986 [JP] Japan ................................. 61-71161

[51] Int. Cl.⁴ ............................................. F16D 13/60
[52] U.S. Cl. ............................ 192/107 C; 192/107 M
[58] Field of Search ...................... 192/107 C, 107 M

[56] References Cited
U.S. PATENT DOCUMENTS

| | | | |
|---|---|---|---|
| 2,992,716 | 7/1961 | Brugger | 192/107 C |
| 4,349,093 | 9/1982 | Tsujio | 192/107 R |
| 4,741,424 | 5/1988 | Kitano et al. | 192/107 M |

FOREIGN PATENT DOCUMENTS

| | | | |
|---|---|---|---|
| 3619894 | 1/1987 | Fed. Rep. of Germany ... | 192/107 C |
| 0294221 | 12/1986 | Japan .............................. | 192/107 C |

Primary Examiner—Rodney H. Bonck
Assistant Examiner—Andrea Pitts
Attorney, Agent, or Firm—Armstrong, Nikaido, Marmelstein, Kubovcik & Murray

[57] ABSTRACT

A clutch disc having an organic facing for a light load and a cerametallic facing for a heavy load which are arranged adjacently in a circumferential direction of a driven plate. The organic facing is mounted on a reinforcing plate. A cushion is provided behind the organic facing for mounting such organic facing on the driven plate. A reinforcing plate is provided between the cerametallic facing and the driven plate and the cerametallic facing is fixed to such reinforcing plate with an adhesive.

7 Claims, 3 Drawing Sheets

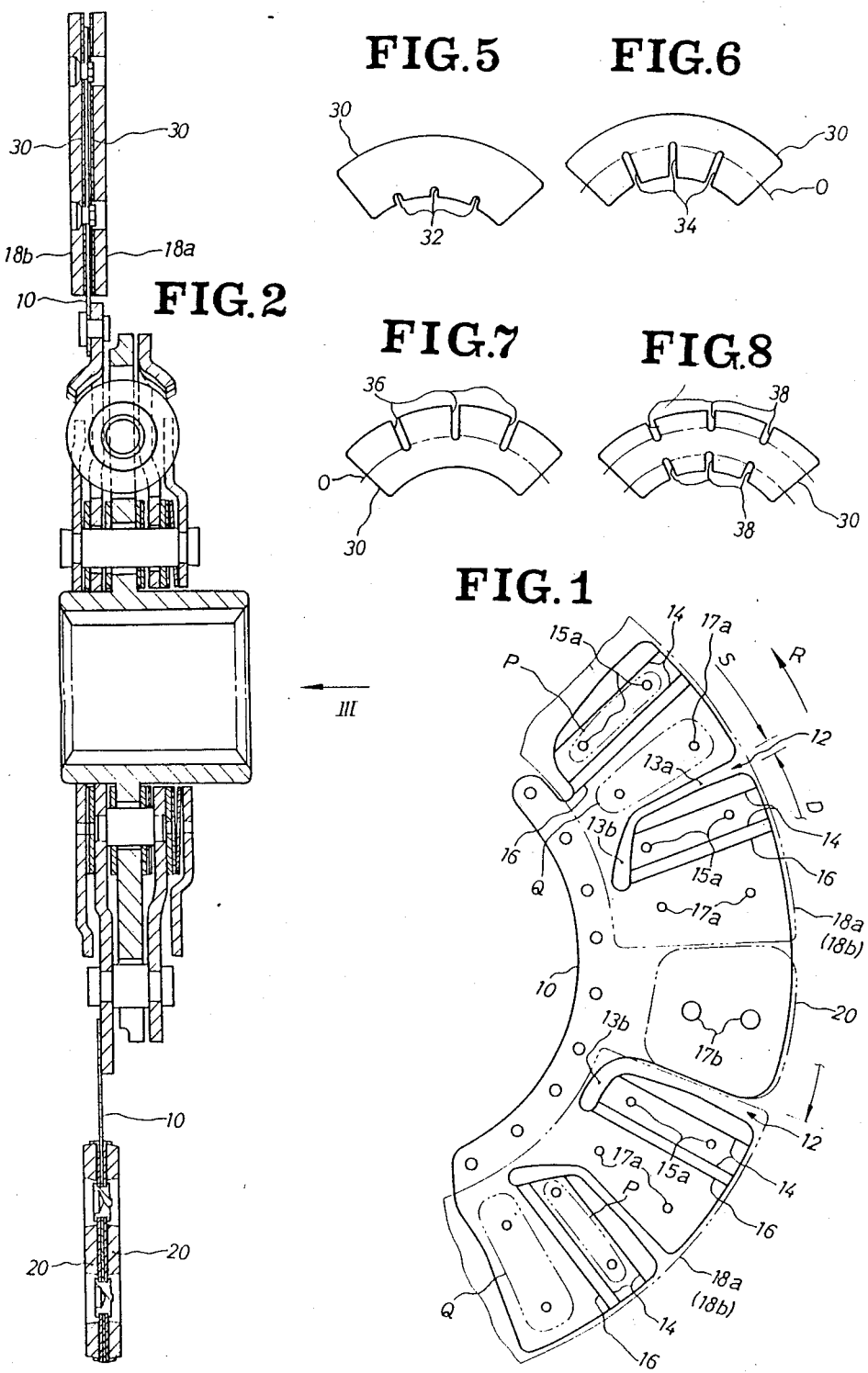

CLUTCH DISC

TECHNICAL FIELD

This invention relates to an improvement of a combination type clutch disc equipped with an organic facing for light loads and a cerametallic facing made from a metal matrix and a ceramic, for heavy loads. The clutch disc is suited, for example, for automobiles.

BACKGROUND ART

In a conventional clutch disc of the combined type, a disc-like driven plate is lined with an organic facing for light loads and a cerametallic facing for heavy loads. The driven plate is connected to a clutch plate. The organic facing and the cerametallic facing are separated from each other in the circumferential direction on the driven plate.

However, there is a possibility that the organic facing can be broken by a centrifugal force and will burst because the strength of the organic facing is weak rotatably, and will separate circumferentially, resulting in a bursting phenomenon.

OBJECT OF THE INVENTION

An object of the present invention is to provide a clutch disc equipped with an organic facing for light loads and a cerametallic facing for heavy loads, characterized by that the so-called bursting phenomenon, in which the organic facing burst by a centrifugal force, is prevented.

COMPOSITION OF THE INVENTION (1) Technical Measure

A clutch disc equipped with an organic facing for light loads and a cerametallic facing for heavy loads which are arranged adjacent to and in a circumferential direction with a driven plate. In this invention, a cushion is formed on which the organic facing of the driven plate is lined. A reinforcing plate is provided between the organic facing and the driven plate. The reinforcing plate is fixed to the driven plate.

(2) Function

The organic facing in the instant invention, does not burst by centrifugal force, even in high speed rotation, because the organic facing is reinforced by the reinforcing plate. Thus, the strength of the organic facing is increased.

BRIEF DESCRIPTION OF THE DRAWINGS

FIG. 1 is a fragmentary view showing the driven plate in the present invention form the pressure plate side of the clutch disc;

FIG. 2 is a vertical sectional view of the clutch disc of FIG. 1;

FIG. 5 is a plan view of a duraluminum plate;

FIG. 6 to FIG. 8 are plan views of other embodiments of the duraluminum plate.

PREFERRED MODE FOR CARRYING OUT OF THE INVENTION

Figure 3:
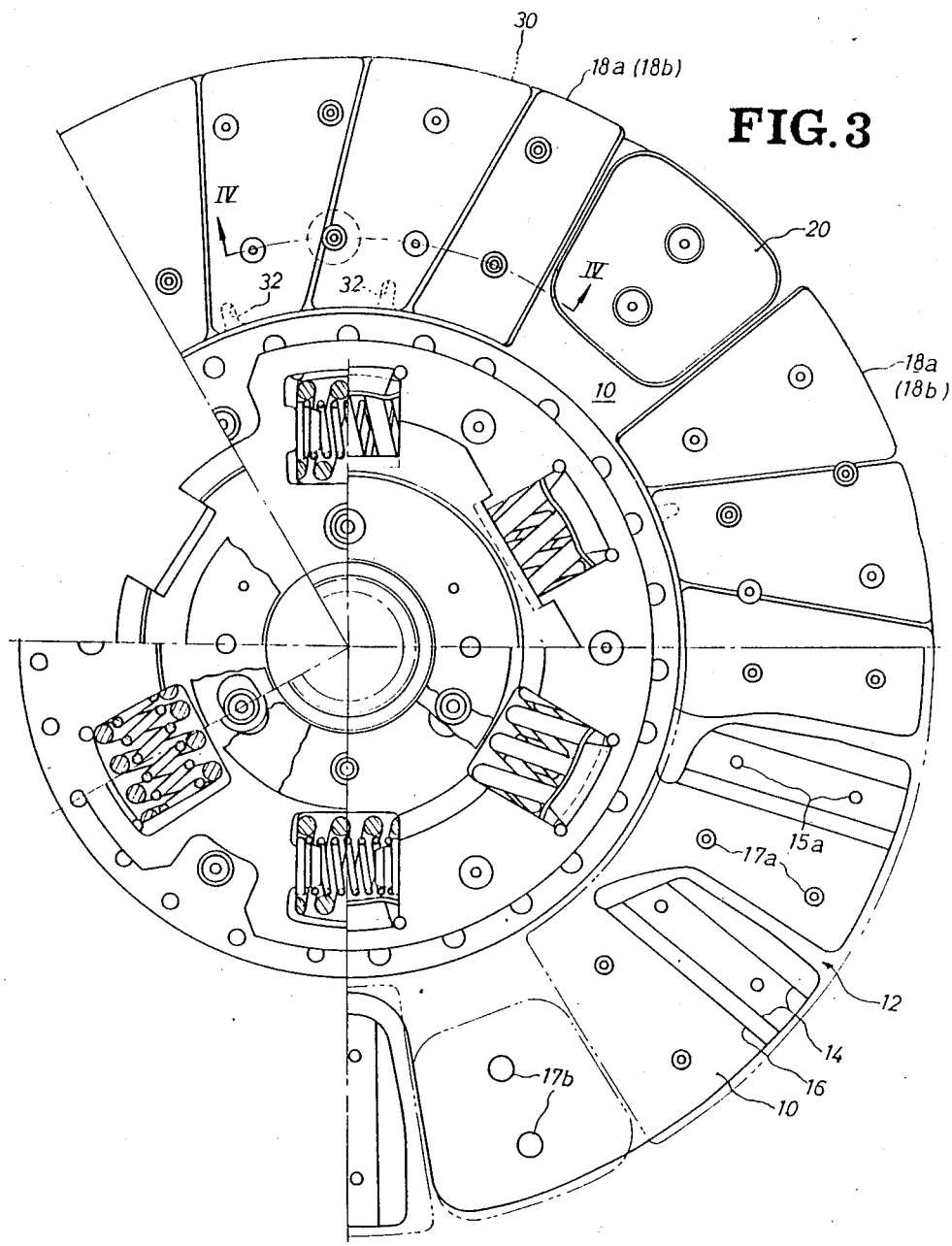
FIG. 3 is a view viewing in the direction arrow III of FIG. 2.

The clutch disc of the invention will be described hereunder with reference to FIG. 1.

FIG. 1 shows driven plate 10 from the pressure plate side. Plural grooves 12 are provided on the driven plate 10 approximately radially from its outer peripheral edge toward its inner periphery. The groove 12 is composed of a radial portion 13a which is directed toward a center of the driven plate 10 and a bent portion 13b which is bent in a direction opposite to arrow R (the arrow R indicates the rotation direction of the clutch disc). Grooves 12 are successively disposed over the circumference of the driven plate 10 alternately between narrow space S and wide space D.

A projected edge line 14 and a recessed edge line 16 are formed radially on the driven plate 10 at a positioned radially outside of the bent portion 13b. P-part, surrounded by the projected edge lines 14, projects toward the pressure plate side to form a cushion. Q-part, adjacent to the recessed edge line 16, is of disc-shape similar to the inner periphery.

Rivet holes 15a are provided on the P-part, and an organic facing 18a (for a light load) on the pressure plate side of driven plate 10 is fastened to the rivet holes 15a by means of rivets. A duraluminum plate (reinforcing plate) is provided between the organic facing 18a and the P-part, as described in more detail later herein.

Rivet holes 17a are provided on the Q-part, and an organic facing 18b on the flywheel side of driven plate 10 is fastened to the rivet holes 17a by means of rivets. The duraluminum plate (reinforcing plate) is positioned between the organic facing 18b and the Q-part.

Rivet holes 17b are made on the driven plate 10 at a left-side of the groove 12 in FIG. 1. Cerametallic facings 20 for a heavy load are fastened to the rivet holes 17b by means of rivets.

Figure 4:
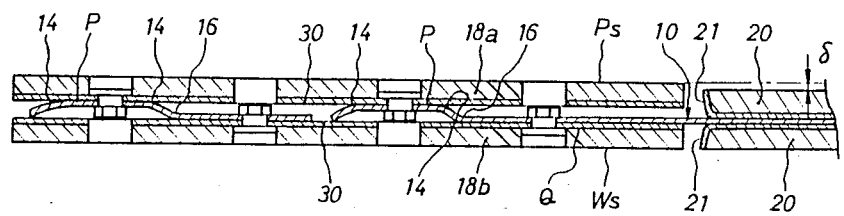
FIG. 4 is a sectional view taken on line IV—IV of FIG. 3.

Practical design examples, as described above, according to the present invention which include the driven plate 10 the both facings 18a, 18b, 20 are shown in FIG. 2–FIG. 4. FIG. 3 is a view shown in the direction of arrow III of FIG. 2. FIG. 4 is a sectional view taken along line IV—IV of FIG. 3. In FIG. 2–FIG. 4, components identified with the same reference numerals as in FIG. 1 are the same or equivalent components.

In FIG. 4, face Ps of organic facing 18a is opposite to a pressure plate, not shown and, organic facing 20 is opposite to a flywheel, not shown.

The cerametallic facing 20 is fixed to the opposite surfaces of the driven plate 10, adjacent to organic facings 18a, 18b. The surface of the cerametallic facings 20 on the flywheel side is at the same level as end face or surface Ws. The surface of the cerametallic facing 20 on the pressure plate side is lower than the end face of the surface Ps by a projecting amount of "δ". 21 is a reinforcing plate for the cerametallic facing 20.

On the back surface of the organic facings 18a, 18b, a duraluminum reinforcing plate 30 is fixed by means of heating adhesion, for example. Duraluminum plate 30 is formed in fan-shaped substantially the same as the organic facings 18a, 18b. As best shown in FIG. 3, slits 32 (FIG. 5) are formed on an inner edge of the duraluminum plate 30 to prevent heating strain.

Function will be described hereunder. First, at an initial stage of engagement wherein a clutch disc begins to be pressed by the pressure plate, the pressure plate presses the organic facing 18a, projecting by the projecting amount of the "δ" beyond cerametallic facing 20. Since the P-part is deflected by a pressing-on force in this instance, a cushion effect of P-part provides a smooth engagement action even if violent clutch pedal operation is made at the initial stage of engagement.

When the engagement action progresses, the organic facing 18a becomes flat with the cerametallic facing 20 and opposed, cerametallic facing 20 are pressed by the pressure plate and flywheel.

The duraluminum plates 30 are fixed on the back surface or the organic facings 18a, 18b, respectively, so that the centrifugal force, in high revolution, transmits to the driven plate 10 from the duraluminum plate 30. Consequently, organic facing 18a, 18b are not broken by the centrifugal force, even in high revolutions.

The organic facings 18a, 18b and the duraluminum plate 30 are adhered by means of heating adhesion. The inner stress of the duraluminum plate 30 produces a heating strain caused by heating and cooling. The duraluminum plate 30 bends under such heating strain. Because the organic facings 18a, 18b and the duraluminum plate 30, respectively, are adhered to each other, there is the possibility that the organic facings 18a, 18b will be bent.

However, because of the slits 32 formed on the duraluminum plate 30, as shown in FIG. 5, the slits 32 absorb the heating strain on the duraluminum plate 30, and the duraluminum plate 30 remains almost flat-shaped. Further, an adhesive may spread on through all contacting face between the both organic facings 18a, 18b and the duraluminum plate 30 or may spread on some part of the contacting face.

EFFECT OF THE INVENTION

As described above, in the clutch disc according to the present invention, the back face of the both organic facings 18a, 18b are reinforced by means of the duraluminum plate 30. Therefore, the following advantage becomes obtainable.

In high revolution, the centrifugal force acts on the organic facings 18a, 18b, which are reinforced by the duraluminum plate 30. the so-called bursting phenomenon, which could cause both organic facings 18a, 18b to burst, is prevented.

Further, in the cushioning, when the driven plate 10 are deformed by the pressure force from the pressure plate, the projected edge line 14 and the recessed edge line 16 of the driven plate 10 slips on the back surface of both organic facings, pressing the back surface of the organic facings together. The duraluminum plate 30 protect the organic facings 18a, 18b from damage by the projected edge line 14 and the recessed edge line 16, because the back surface of the both organic facings 18a, 18b are covered by the duraluminum plate 30.

In the case of the slits 32 formed on the duraluminum plate 30 for preventation of the heating strain, the slits 32 prevent the heating strain produced by the heating adhesion of the both organic facings 18a, 18b and the duraluminum plate 30, and keep the organic facings 18a, 18b in nearly plane-shape, that is, from warping.

ANOTHER EMBODIMENT (1) when embodying the slits 32 on the duraluminum plate 30, not only the construction as shown in FIG. 5 but that shown in FIG. 6–FIG. 8 may be used. In FIG. 5, the slits 32 are formed into relative shallow recesses on the inner edge of the duraluminum plate 30. In FIG. 6, slits 34 are formed into deeper recess than center line 1, and in FIG. 7, slits 36 are recess on the outer edge of the duraluminum plate 30. In FIG. 8, slits 38 are formed on the both inner and outer edge of the duraluminum plate 30.

We claim:

1. A clutch disc having an organic facing for light loads and a cerametallic facing for heavy loads said facings being arranged adjacent to each other in a circumferential direction of a driven plate, characterized by that a cushion is formed at a part of said driven plate on which said organic facing is fastened to said driven plate, and a reinforcing plate is positioned between said organic facing and said driven plate, said reinforcing plate being fixed to said driven plate.

2. A clutch disc as set forth in claim 1, in which recesses are formed on said reinforcing plate for absorbing strain produced in said reinforcing plate by the heating adhesion between said organic facing and said reinforcing plate when said organic facing and said reinforcing plate are adhered by heating.

3. A clutch disc as set forth in claim 2, in which said recesses are plural slits on a inner edge of said reinforcing plate extending a relatively short distance into said inner edge.

4. A clutch disc as set forth in claim 2, in which said recesses are plural slits on a inner edge of said reinforcing plate extending a relatively long distance into said inner edge.

5. A clutch disc as set forth in claim 2, in which said recesses are formed into slits at plural positions on an outer edge of said reinforcing plate.

6. A clutch disc as set forth in claim 2, in which said recesss are formed into slits at plural positions on an outer and inner edges of said reinforcing plate.

7. A clutch disc as set forth in claim 1, in which said cushion is formed by substantially radial projected and folded edges on said driven plate projecting in a direction from one side of said driven plate.

* * * * *